July 31, 1945.   F. TROSTLER ET AL   2,380,881
WASHING OF GRANULAR MATERIALS
Filed Dec. 28, 1942   2 Sheets-Sheet 1
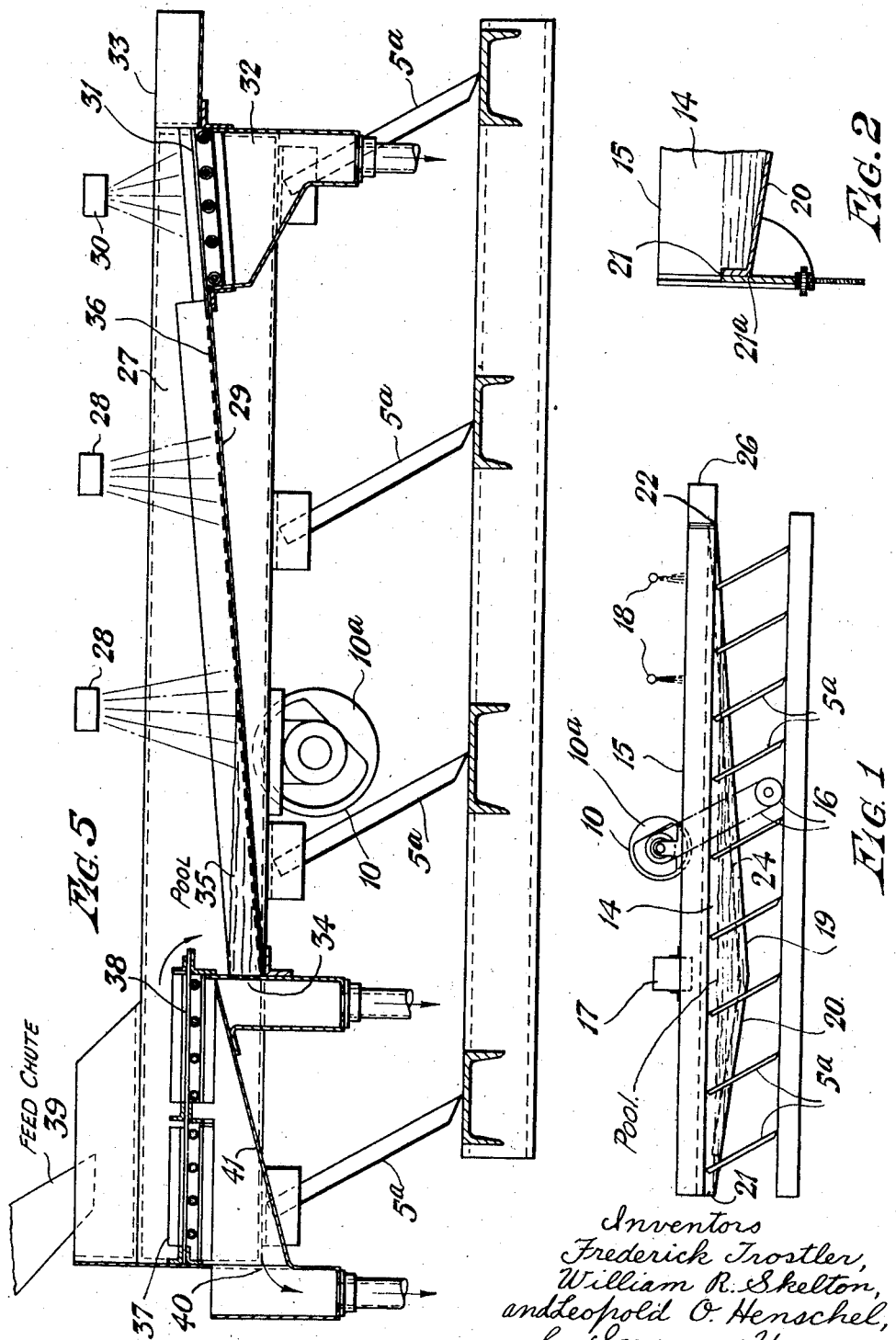
Inventors
Frederick Trostler,
William R. Skelton,
and Leopold O. Henschel,
by Sommers + Young
Attorneys

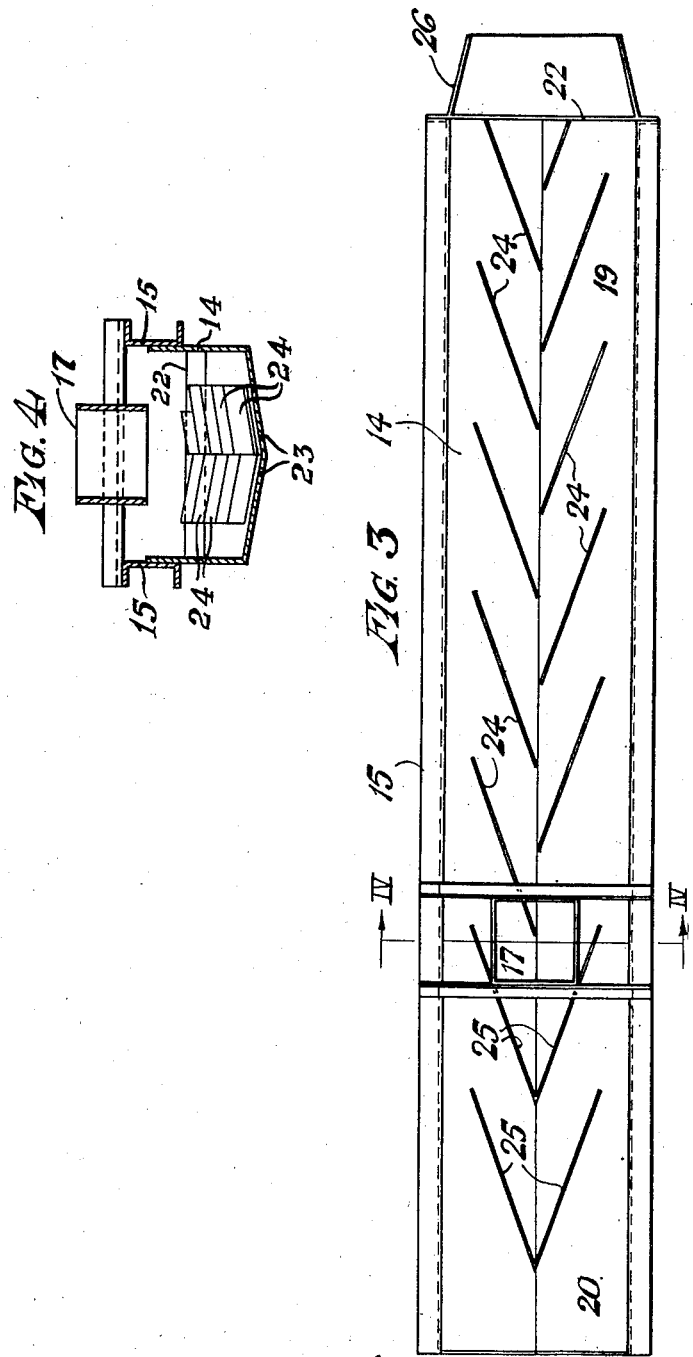

Patented July 31, 1945

2,380,881

UNITED STATES PATENT OFFICE 2,380,881

WASHING OF GRANULAR MATERIALS

Fredrick Trostler, Virginia Water, England, and William Richard Skelton, Brynford, and Leopold Otto Henschel, Holywell, North Wales Application December 28, 1942, Serial No. 470,366
In Great Britain October 21, 1941

3 Claims. (Cl. 209—442)

This invention comprises improvements in and relating to the washing of granular materials and has for its general object to provide new or improved apparatus for treating materials of this nature in order to clean or separate from them matter intermixed with or adherent thereto.

In the art to which this invention relates, numerous forms of so-called washers have been in practical use for many years. In order to facilitate understanding of the invention, mention may be made of the well-known trommel washer which comprises an inclined cylindrical screen rotatable in a tank. Material to be washed is fed in with water at one end of the screen and discharged at the other end, the washed-out particles, herein termed washings, which are generally fine material or slimes, passing through the screen into the tank from which they are removed in suitable manner.

Now, under practical conditions, it is found that material to be washed often contains light particles, for example coke grains, wood chips, sawdust or other organic matter, and in the case of trommel washers these generally float away to the discharge end of the screen and contaminate the washed material. With trommel washers, too, the screen is intended to pass fine materials and thus they are unsuitable for washing materials comprising fine particles which are smaller than the size determining the apertures of the screen. Moreover, if the feed consists of comparatively coarse and also fine particles, the wear caused by the coarse lumps on the fine screen is prohibitive. Furthermore, the washed material discharges with the water and thus generally requires to be dewatered before it can be put to practical use. Trommel washers are also of comparatively complicated and expensive construction and it is well-known that there are limits to the efficiency of the washing action obtained with them.

An important object of the present invention is to provide means whereby the above disadvantages can be effectively overcome and washing of various materials carried out with reliability and improved efficiency.

According to this invention, apparatus for washing granular material comprises a trough having its bottom inclined upwardly towards a point where discharge of the scrubbed material takes place, means for feeding unwashed or partly washed material to the lower end of the trough, means for feeding water on to the inclined bottom of the trough towards its upper end, an overflow for wash liquors or pulp at the lower end of the trough, and means for imparting vibratory or jigging motion to the trough.

The apparatus may conveniently comprise a pan at the lower end of the trough to provide a pool of wash liquors; the trough may, for example, have a part the bottom of which inclines slightly in the opposite direction to the said inclined bottom. The material to be washed is given vigorous scrubbing treatment in the pool at the foot of the inclined bottom, aided by the vibratory or jigging motion and traversed from out of the pool up the inclined bottom against the water moving in counter-current. The pan part may vary in length up to say about one half the length of the inclined bottom, and by having this pan part comparatively long, e. g. about half the length of said inclined bottom of the trough, and placing the overflow a few inches below the level of the top of such inclined bottom, a more vigorous scrubbing action can be obtained in the trough.

The inclined bottom of the trough is suitably depressed along its longitudinal centre line in reference to the remaining portion of its surface, and fitted with deflectors or riffles which preferably are disposed so as to incline forwardly and alternatively in opposite directions from spaced points along the centre line of such bottom to points adjacent the sides of the trough. The construction described would cause the material to be crowded together with the particles coming repeatedly into rubbing contact (because of the shape of the container coupled with the jigging or vibratory motion), and would facilitate the movement of the material which would tend to be towards the sides of the trough, while facilitating draining away of the water which would have a tendency to travel to and flow down the centre line of the trough through the spaces between the inner ends of the successive riffles. If desired, the bottom of the pan part may be provided with similar riffles though in this case they may be of V-disposition as they are not required to facilitate draining away of water, but rather to retard backward flow of the material. Any light particles of organic matter or other small adhering particles which may be contained in or adhering to the material under treatment (after the treatment in the pool and after the ascent of the incline has begun), will be washed down the incline and away from the discharge point by the water. In other words, they will be floated towards the discharge for the wash liquor or pulp and the material climbing up the incline will therefore be free from these impurities. This is of considerable importance where, for instance, gravel is washed for concrete mixing. The tendency of the washings (including the fine slimes) or other impurities also will be to pass down the incline so that a screening action need not be relied upon for removing this fine component and comparatively fine granular materials may consequently be washed. It will be noted too that since the water moves down the incline, its movement is away from the discharge point for the washed material so that the latter can be comparatively free from water when discharged, i. e. much dryer than material washed by a trommel washer, so that, unless desired, there is no need for de-watering in a separate apparatus. Finally, the vigorous scrubbing action provides a much improved washing process, such scrubbing being different from mere movement of the material and water in opposite directions and indicating a harsh treatment.

The apparatus may be applied to the washing of various materials and is particularly advantageous for washing gravel and for cleaning the separation products of gravity concentration processes, using suspensions as the separating liquid, from adherent particles of the suspension solid. It is also applicable for such uses as the washing of brewers' grains, a waste product from the fermentation and which contains granular material, namely partially digested barley, which is required to be freed of the husks of the grain if it is to be used for such purposes as animal feeding.

In order to enable the invention to be readily understood reference is directed to the following description of the construction and operation of practical examples of apparatus provided in accordance with the present improvements and illustrated by the accompanying drawings wherein:

Figure 1 is an elevation of one example.

Figure 2 is a fragmentary sectional view illustrating a modification.

Figure 3 is a plan of Figure 1 to a larger scale.

Figure 4 is a section on the line VI—VI of Figure 3, and

Figure 5 is a sectional elevation of another example.

The example illustrated in Figures 1 to 4, comprises a trough 14 of box form mounted in a vibratory frame 15, which is supported on articulate or flexible legs 5a and made capable of jigging or vibration by an unbalanced pulley or flywheel 10 mounted on the frame and driven by the means indicated diagrammatically at 16. Feed of the granular material to the trough for treatment is at 17 and the water is provided by the sprays at 18. The trough has a doubly sloped bottom, the part 19 constituting the incline up which, under the jigging or vibration, the material climbs from the pool formed by the water. The bottom part 20 slopes in opposite manner to the part 19 but at a small angle so that the overflow for the wash liquors at 21 is a few inches lower than the discharge lip, at 22, of the incline 19 and thus the pool would be formed on the lower part of the trough below the feed at 17. The height of the overflow at 21 could be controlled by a vertically adjustable weir or slide indicated at 21a on the fragmentary sectional view shown in Figure 2, and similar provision could be made for the overflow in the other of the examples herein described. The bottom portion 20 in Figures 1 to 4 is relatively long, being shown about half the length of the incline 19, e. g. these parts might respectively be about five and ten feet long in plan, the width of the trough between its longer sides being about half as much as the length of the part 20, say 2'3".

Causing the bottom portion 20 to slant upwardly with opposite inclination to the part 19 serves the purpose of crowding the particles of the material together, so that vigorous scrubbing action of the same against each other in the pool will be ensured. Adjustment of the height of the overflow at 21 serves the purpose of varying the depth of the pool and of the distance up the incline, 19, throughout which the particles travelling up the incline will be entirely submerged. This distance may advantageously be varied to meet different conditions. Thus, when more thorough washing is required, the distance may be greater, and when a comparatively greater dewatering of the material is desired, the distance may be less.

A further feature is a formation of the trough bottom so as to incline transversely upwardly in opposite directions from the centre line of the trough, as indicated at 23 in Figure 4, and the provision on the bottom of deflectors or riffles 24. Along the incline 19, the riffles incline forwardly and alternately in opposite directions from spaced points along the centre line of the trough to points adjacent the sides of the trough. These riffles facilitate climbing of the material up the incline 19 (since it is easier to ascend an inclined plane at an angle, than straight up), and tend to direct it towards the sides of the trough, so that it is distributed quite evenly although the bottom of the trough is centrally depressed along its length. At the same time, the riffles tend to cause the water to travel to and flow down the centre line of the trough through the spaces between the inner ends of the successive riffles, this action being enhanced by the depression of the bottom of the trough along the centre line. This arrangement may be desirable when the scrubbing of the material has been largely completed in the pool at the bottom, and the chief functions of the upper part of the incline 19, are the removal and the dewatering of the material. On the bottom part 20, similar riffles may be provided though, for preference, and as shown at 25, they are arranged in V form as their object would be rather to retard backward motion of the material, i. e. towards the overflow. At the discharge lip 22 a discharge spout 26, with upstanding and slightly converging sides may be provided if desired, and similar provision may be made in other examples described herein. If desired, the depression of the bottom of the trough at 23 may even out to level formation of the bottom at the overflow 21 and the discharge lip 22.

In the example illustrated by Figure 5, the vibratorily mounted trough 27 is used in association with means for performing an extra washing of the granular material. Two spray pipes 28 are shown for use in the scrubbing action taking place on the incline 29, and an extra spray pipe 30 is placed over a wedge wire screen 31 at the top of the incline in order to effect the extra washing, the wash liquor passing the screen 31 running away through a hopper 32, and a discharge spout 33 for the treated granular material being provided beyond this screen. This example is of advantage for instance, when extremely thorough washing is wanted, or when wash liquors of different dilutions are desired, for instance a wash liquor of one character can be obtained from the overflow at 34 and a wash liquor of a more dilute character is obtainable from the extra washing at the screen 31.

It will be seen in Figure 5, that, if desired, the incline (29) up which the granular material climbs and on which it is scrubbed and washed, may extend from the wash liquor overflow (34). In such a case there would still be formation of a pool, as at 35, into which feed of the granular material would take place as indicated.

In Figure 5, the imperforate incline 29 is shown covered with wire mesh 36 to impart a roughened surface for facilitating climbing of the granular material up the incline. Obviously, as an alternative or in addition to the mesh 36, deflectors or riffles of the character shown in Figure 1, for instance, may be used.

The example shown in Figure 5 also incorporates a preliminary screen box 37, with wedge-wire screen 38, and feed of material to be treated is made on to this screen by the feed chute 39. This construction is useful, for example, in cases where granular materials, in the form of tailings or concentrates from gravity separation processes using a suspension as the separating medium, are desired to have medium drained from them before washing, because it enables separate draining screens to be dispensed with, with resultant saving of space and of mechanical means for operating them. Thus, the tailings or concentrates may be fed to the screen 38 directly from the discharges of the gravity separation apparatus and the recovered medium drains off, without dilution by washing water, through the screen 38, discharging at 40 from the lower end of the sloping bottom 41 of the box 37. The granular materials, thus drained, discharge from the forward end of the screen 38 into the trough 27 as shown by the arrow. Obviously, a preliminary screen box similar to that shown in Figure 5 may be used in conjunction with the other example of apparatus described herein, discharge of the drained granular material from screen 38 then being into the pool referred to in connection with such example.

The invention is not restricted to the examples of apparatus herein described and illustrated as further modifications within the broad concept of the invention are possible as will be understood by those skilled in the art.

It is to be noted that it is of advantage to have the trough and pan comparatively wide so as to present appropriately extended surface for the desired washing and scrubbing treatment and that this treatment is carried out in a relatively shallow layer of water both in the pool and on the incline up which the washed material climbs to discharge.

We claim:

1. In apparatus for washing granular material, the combination of a member mounted for jigging motion and means for imparting such motion thereto, said member having a portion adapted to receive a pool of wash liquors and an inclined trough portion extending upwardly therefrom, said trough portion having a bottom which is depressed along its longitudinal centre line in reference to the remaining portions of its surface, and having riffles extending from spaced points along said centre line at forwardly and outwardly inclined angles, said riffles being inclined alternately towards the opposite sides of said trough portion, means for feeding wash water on to said inclined trough portion, and means for feeding material including granular particles to be washed on to said member adjacent to the lower end of said inclined trough portion, the inclination of said trough portion being so chosen that granular particles of said material will move out of the wash liquor in said pool-receiving portion and upwardly on said trough portion during the jigging motion, in counter current to the wash water.

2. In apparatus for washing granular material, the combination of a member mounted for jigging motion and means for imparting such motion thereto, said member having a portion adapted to receive a pool of wash liquors and an inclined trough portion extending upwardly therefrom, said trough portion having a bottom inclined transversely upwardly in opposite directions from its longitudinal centre line and having riffles extending from spaced points along said centre line at forwardly and outwardly inclined angles, said riffles being inclined alternately towards the opposite sides of said trough portion, means for feeding wash water on to said inclined trough portion, and means for feeding material including granular particles to be washed on to said member adjacent to the lower end of said inclined trough portion, the inclination of said trough portion being so chosen that granular particles of said material will move out of the wash liquor in said pool-receiving portion and upwardly on said trough portion during the jigging motion, in counter current to the wash water.

3. In apparatus for washing granular material, the combination of a member mounted for jigging motion and means for imparting such motion thereto, said member comprising an inclined trough having a discharge lip at its upper end, and a screen box adjacent to the lower end of said trough, means for feeding material including granular particles to be washed on to the screen in said screen box, means for spraying wash water on to said trough, and means providing an overflow for wash liquors adjacent to the lower end of said trough at a height sufficient to provide a pool of wash liquor at the lower end of said trough, said screen box being positioned to discharge material which does not pass through the screen thereof into said pool and the inclination of said trough being so chosen that granular particles of said material will move out of said pool and ascend said trough during the jigging motion.

FREDRICK TROSTLER.
WILLIAM RICHARD SKELTON.
LEOPOLD OTTO HENSCHEL.